United States Patent
Goodsel et al.

(10) Patent No.: US 7,014,225 B1
(45) Date of Patent: Mar. 21, 2006

(54) SNAP CONNECTOR FOR THE COUPLING OF PIPES

(75) Inventors: Kelly J. Goodsel, Corry, PA (US);
Ernest Lane, Jr., Gilbert, AZ (US);
Cyrus D. Gilson, Union City, PA (US);
Michael Hiner, Corry, PA (US)

(73) Assignee: Viking Plastics, Inc., Corry, PA (US)

( * ) Notice: Subject to any disclaimer, the term of this patent is extended or adjusted under 35 U.S.C. 154(b) by 92 days.

(21) Appl. No.: 10/934,990

(22) Filed: Sep. 7, 2004

(51) Int. Cl.
*F16L 23/00* (2006.01)

(52) U.S. Cl. ........................ 285/364; 285/363; 285/921
(58) Field of Classification Search ................ 285/921, 285/363, 364, 365
See application file for complete search history.

(56) References Cited

U.S. PATENT DOCUMENTS

| | | | | |
|---|---|---|---|---|
| 1,649,752 A | * | 11/1927 | Stone | 285/419 |
| 3,602,532 A | * | 8/1971 | Ehrenberg | 285/364 |
| 3,865,413 A | * | 2/1975 | Mizusawa et al. | 285/367 |
| 4,326,737 A | * | 4/1982 | Lehmann | 285/112 |
| 4,452,097 A | * | 6/1984 | Sunkel | 74/502.4 |
| 4,693,502 A | * | 9/1987 | Oetiker | 285/334.5 |
| 4,958,861 A | * | 9/1990 | Hamilton | 285/148.16 |
| 5,015,013 A | * | 5/1991 | Nadin | 285/64 |
| 5,320,391 A | * | 6/1994 | Luthi | 285/365 |
| 5,647,612 A | * | 7/1997 | Yoshida et al. | 285/13 |
| 5,738,384 A | * | 4/1998 | Boehme | 285/114 |
| 6,102,448 A | * | 8/2000 | Fixemer et al. | 285/330 |
| 6,497,435 B1 | * | 12/2002 | Luft et al. | 285/360 |

* cited by examiner

*Primary Examiner*—James M. Hewitt
(74) *Attorney, Agent, or Firm*—Renner, Kenner, Greive, Bobak, Taylor & Weber

(57) ABSTRACT

A pipe and snap connector assembly including mating male and female pipes joined by a clam-shell type connector. The female pipe receives a portion of the male pipe, and each pipe provides a radial flange configured such that there is a gap between the radial flanges when the male pipe is received in the female pipe. A sealing washer or seal is disposed between the flanges, in the gap. The clam-shell type connector is of open-ended barrel construction, and includes a radial clamp cavity that is sized to contact the radial flanges on the male and female pipes and axially compress them against the seal to provide a fluid-tight connection of the pipes. A latch and catch mechanism on the connector can be opened and closed without the use of special tools.

4 Claims, 4 Drawing Sheets

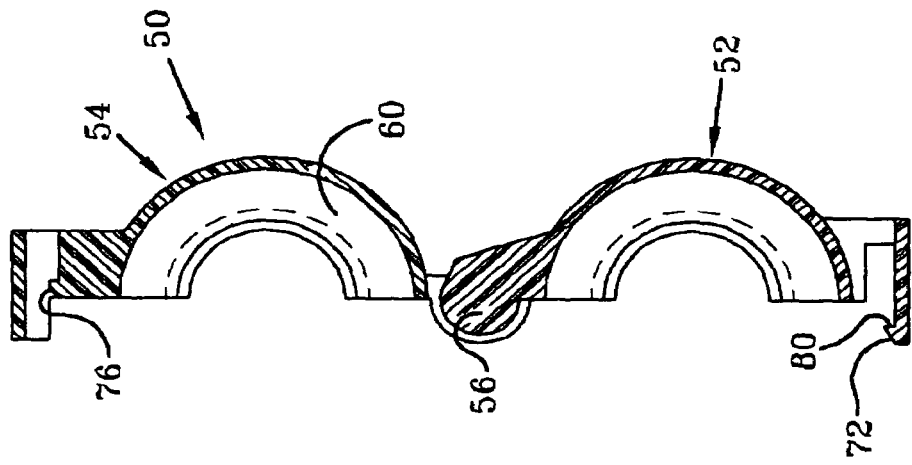
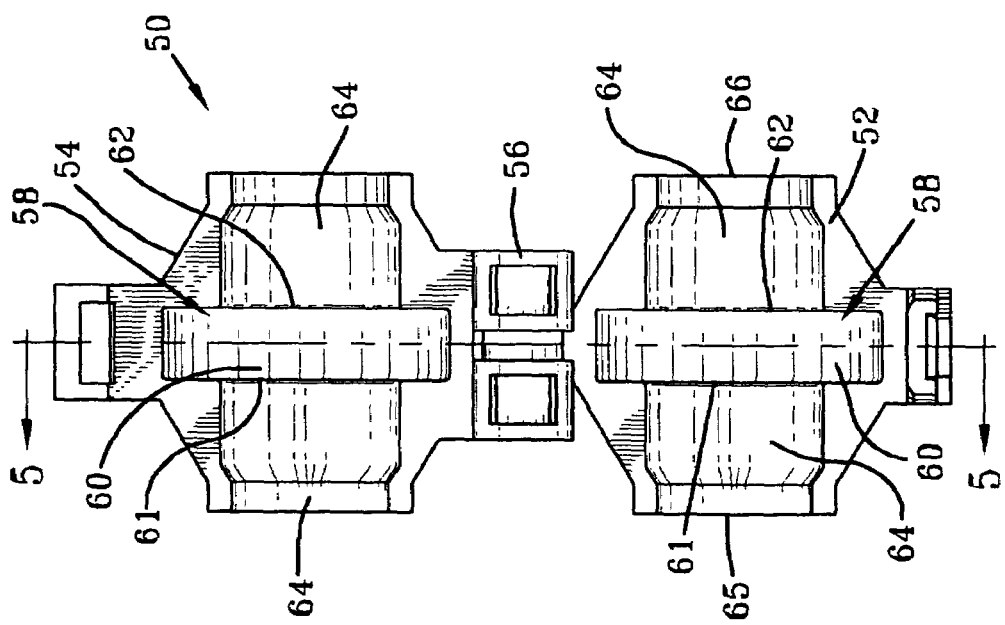

SNAP CONNECTOR FOR THE COUPLING OF PIPES

BACKGROUND OF THE INVENTION

The present invention relates to a clam-shell type coupling member employed to join two pipes to allow for the flow of fluid therethrough without compromising the flow of the fluid at the area of joinder. More particular, this invention is a snap connector for connecting, with a fluid-tight seal, two mating pipes of particular configuration.

Snap connectors are generally known in the art, and it is generally appreciated that such connectors should be relatively easy to employ. It is preferred that snap connectors be capable of use without the need for employing tools to effect a joinder of the pipes, as the use of tools is undesirably time consuming. The connector should, however, provide a tight seal between the pipes, to inhibit any loss of fluid that is to flow through the joined pipes.

The prior art has been somewhat successful in providing snap connectors that substantially achieve one or more of these goals; however, the designs of the prior art are herein departed from in order to provide a snap connector and pipe assembly that is simple in configuration and allows for a fluid-tight connection of pipes, without requiring the use of special tools.

SUMMARY OF THE INVENTION

In general, the present invention provides a pipe and snap connector assembly including mating first and second pipes joined by a clam-shell type connector. The first pipe has a receiving end defined by an expanded diameter terminating at an open end about which radially extends a first flange including inner and outer surfaces. The second pipe has a second flange that radially extends from an insertion end of the second pipe. The insertion end is sized to mate with the receiving end of the first pipe by fitting interiorly of the expanded diameter that defines the receiving end, and the insertion end is longer than the receiving portion such that a gap exists between the first and second flanges when the insertion end of the second pipe is fully inserted into the receiving end of the first pipe. The second flange of the second pipe also includes inner and outer surfaces. A sealing washer or seal is disposed in the gap and contacts the inner surfaces of the first and second flanges. The seal has an uncompressed thickness that is greater than the width of the gap. The connector holds the first and second pipes in mating engagement, and includes a radial clamp cavity defined by a radial wall joining sidewalls that engage the outer surfaces of the first and second flanges and axially urge the flanges together in compressive engagement with the seal. In effect, the flanges define a radial breach for engagement with the seal. The connector further includes a nesting cavity that is axially disposed outwardly of each sidewall of the clamp cavity, and this nesting cavity receives the expanded diameter of the receiving end of the first pipe at a selective axial position relative to the radial clamp cavity.

BRIEF DESCRIPTION OF THE DRAWINGS

For a complete understanding of the objects, techniques and structure of the invention, reference should be made to the following detailed description and accompanying drawings wherein:

FIG. 4 is a front view of the snap connector of this invention, shown in an open configuration;

FIG. 5 is a cross-sectional side view of the snap connector of this invention taken along line 5—5 in FIG. 4;

DETAILED DESCRIPTION OF THE INVENTION

Figure 1:
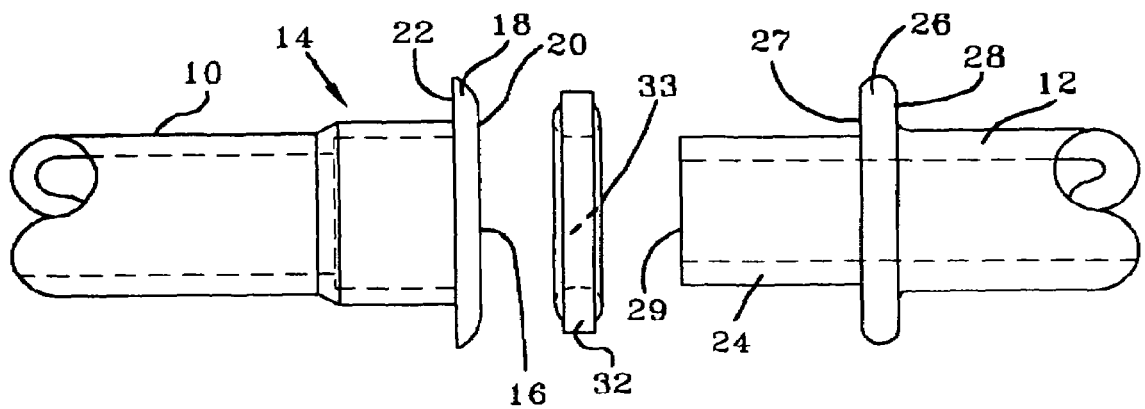
FIG. 1 is an assembly diagram of pipes, with male and female connection means according to this invention shown separated, but aligned for mating, with a seal aligned therebetween.
Figure 2:
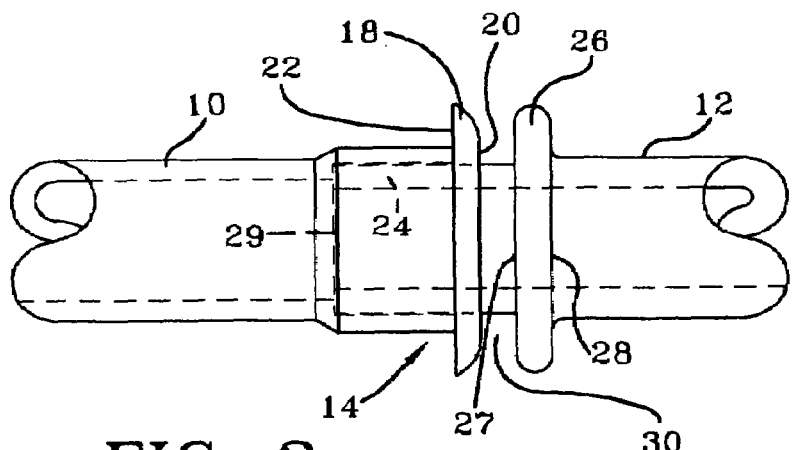
FIG. 2 is a side view of the male and female pipes, as they would mate without the presence of a seal therebetween.
Figure 3:
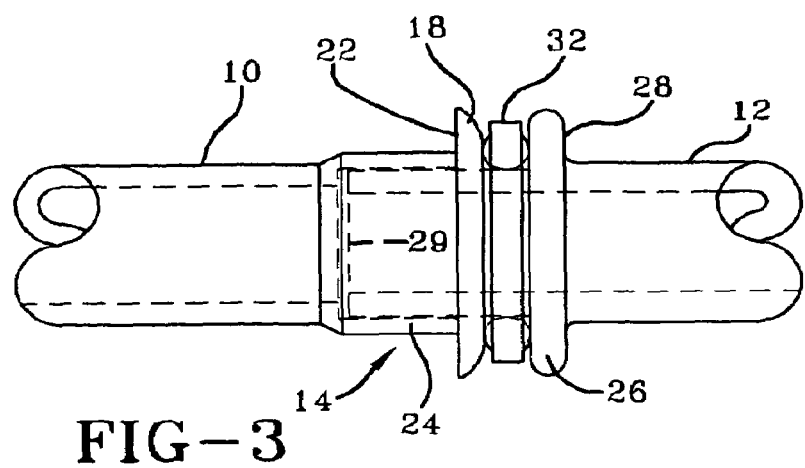
FIG. 3 is a side view of the male and female pipes as they mate with a seal therebetween.

The snap connector of the present invention is particularly applicable to the joining of pipes of the type found in cooling systems, particularly in the automotive industry, although the present invention is not limited to or by such an application. With reference to FIGS. 1–3, the configuration of the pipes that are joined with the snap connector are generally depicted as female pipe 10 and male pipe 12.

Female pipe 10 has a receiving end 14 that is defined by an expanded diameter terminating at open end 16 about which radially extends a first flange 18 including inner surface 20 and outer surface 22. Male pipe 12 includes an insertion end 24 that is sized to mate with receiving end 14 of female pipe 10 by fitting interiorly of the expanded diameter defining receiving end 14. Second flange 26 radially extends from male pipe 12 and is offset from open end 29 to define insertion end 24. Second flange 26 has inner surface 27 and outer surface 28. Notably, insertion end 24, as measured from inner surface 27 to open end 29 of male pipe 12, is longer than the length of receiving end 14 of female pipe 10, as defined by the expanded diameter thereof. Thus, as can be clearly seen in FIG. 2, a gap 30 exists between first flange 18 and second flange 26 when male pipe 12 is fully inserted into female pipe 10.

It is intended that gap 30 receives a sealing washer or seal 32, as shown in the assembled diagram of FIG. 3 and the exploded, aligned view of FIG. 1. More particularly, seal 32 is sized to have an uncompressed thickness greater than the distance between first flange 18 and second flange 26 (i.e., gap 30), when male pipe 12 is completely inserted into female pipe 10, as shown in FIG. 2. Thus, in FIG. 3, it can be seen that open end 29 of male pipe 12 does not extend as far into the expanded diameter of receiving end 14, when seal 32 is disposed in gap 30, with insertion end 24 extending through aperture 33 in the seal 32. Seal 32 is preferably formed from a resilient, polymeric material, such that its thickness can be readily compressed, when placed under pressure. Particularly, the snap connector of this invention serves to compress first flange 18 towards second flange 26, such that, due to the existence of seal 32 disposed therebetween, a strong bead seal is created at the joining of male pipe 12 and female pipe 10.

Referring now to FIGS. 4 and 5, the snap connecter of the present invention, to be employed with female pipe 10, male pipe 12 and the associated seal 32, is generally depicted by the numeral 50. Snap connector 50 is generally a clam-shell type clamp that is configured as an open-ended barrel comprised of a male half 52 and female half 54 joined by an appropriate hinge 56. Each half 52, 54 of snap connector 50 provides half of a cylindrical cavity for receiving first and second flanges 18, 20, and this cavity is identified as radial clamp cavity 58. More particularly, radial clamp cavity 58 is defined by a radial wall 60 joining sidewalls 61, 62. Sidewalls 61, 62, as perhaps best seen in FIGS. 6 and 7, serve as the primary sealing means for urging flanges 18 and 26 towards each other against seal 32. The distance between sidewalls 61, 62 is slightly smaller than the uncompressed distance between outer surface 22 of flange 18 and outer surface 28 of flange 26, when seal 32 is disposed between pipes 10, 12 and pipes 10, 12 are fitted together as shown in FIG. 3. Thus, to fit flanges 18, 26 into radial clamp cavity 58, seal 32 must be compressed, effecting a good seal between the pipes 10, 12 through an axially compressive force.

Figure 6:
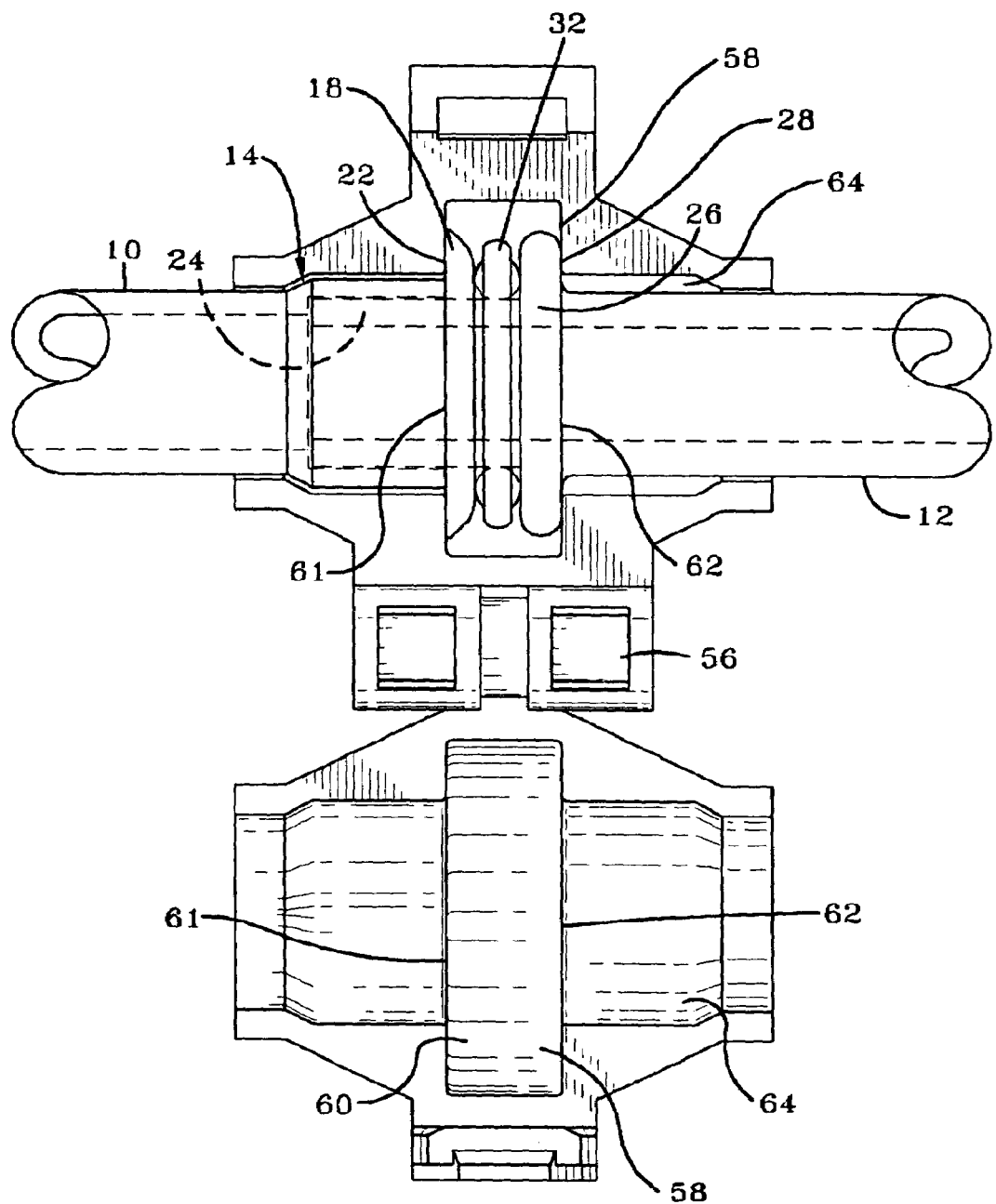
FIG. 6 is a front view of the snap connector of this invention, shown in an open configuration and having the mated pipes, as in FIG. 3, fitted into the top half thereof.
Figure 7:
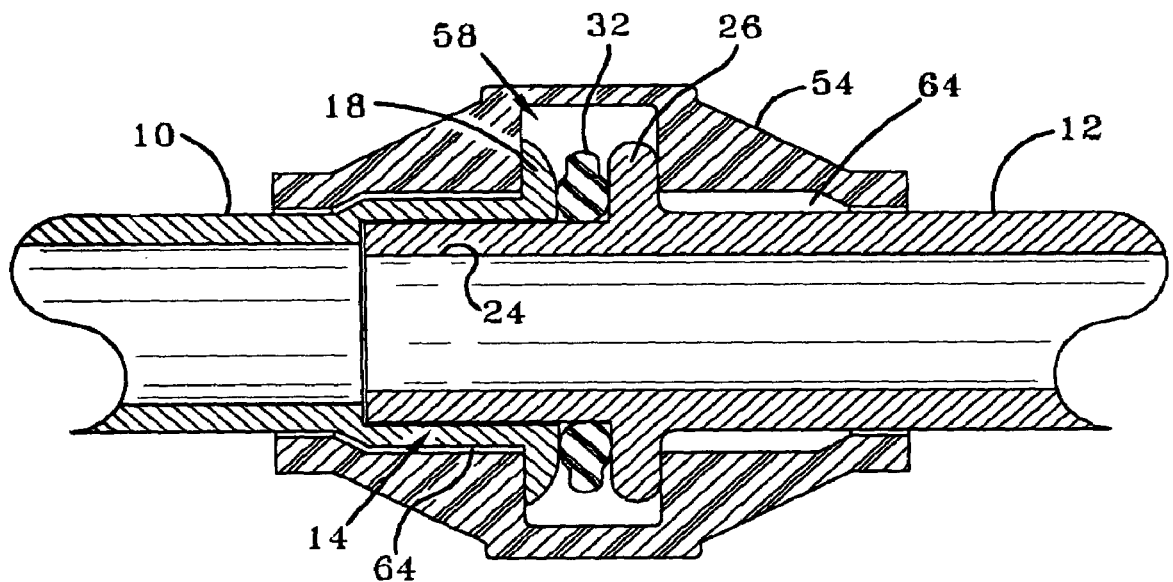
FIG. 7 is a side cross-sectional view of the snap connector closed upon the mated pipes.

Halves 52, 54 of snap connector 50 also provide, disposed outwardly of each sidewall 61, 62 of the radial clamp cavity 58, half of a nesting cavity 64, which is open at its opposed ends 65, 66. Nesting cavity 64 is sized to receive pipes 10, 12, and, more particularly, the expanded diameter of receiving end 14 of female pipe 10, as seen in FIGS. 6 and 7. Due to the symmetrical configuration of snap connector 50, particularly that nesting cavity 64 is disposed on each side of radial clamp cavity 58, the expanded diameter of receiving end 14 of female pipe 10 may be received at a selective axial position relative to radial clamp cavity 58. That is, as can be clearly seen in FIG. 6, the orientation of fitted pipes 10, 12 could be switched, such that female pipe 10 would extend to the right of snap connector 50 and male pipe 12 would extend to the left. This configuration eliminates the need for being concerned with the particular orientation of snap connector 50 relative to pipes 10, 12, and is not provided in the prior art.

Figure 8:
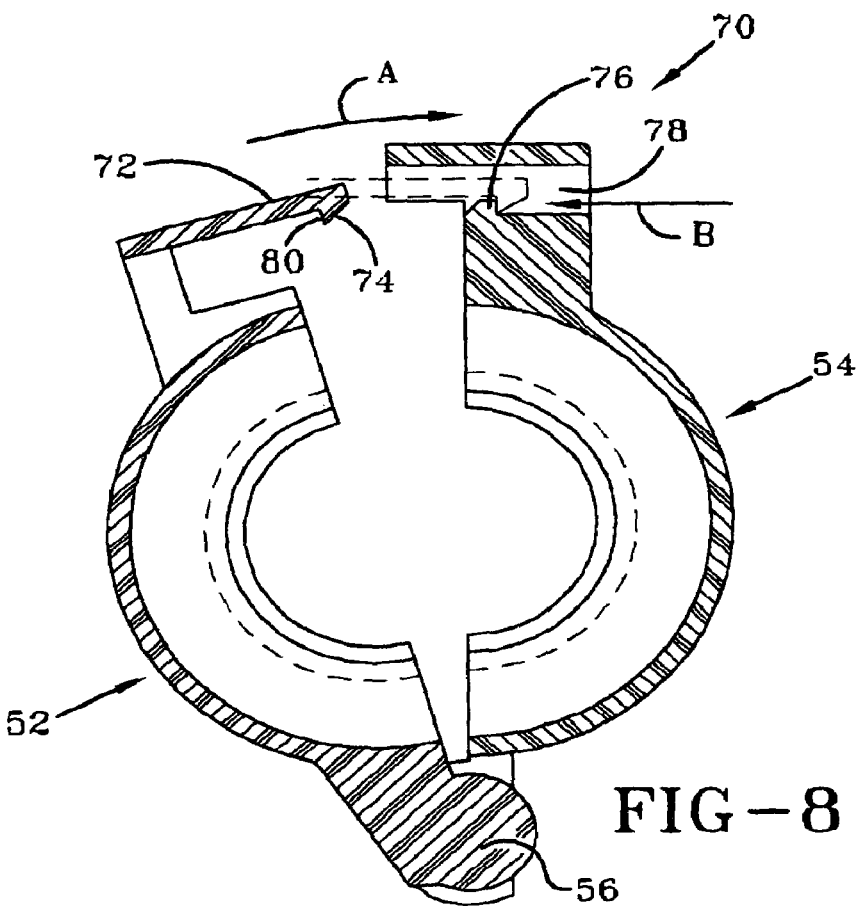
FIG. 8 is a cross sectional view of the snap connector of the invention during closing.

With particular reference to FIGS. 4, 5 and 8, it can be seen that male half 52 and female half 54 of snap connector 50 are pivotally connected by hinge 56, with female half 54 providing a catch 70 for mating engagement with latch 72 of male half 52. Catch 70 receives latch 72 to effect a selectively released closure of snap connector 50. Particularly, halves 52, 54 are pivoted about hinge 56 to bring latch 72 into engagement with catch 70, and, as can be seen in FIG. 8, beveled surface 74 of latch 72 makes contact with lip 76 provided at the opening of slot 78 in catch 70 (arrow A), and is urged to bow against insertion and thereafter relax to a locked position, with lock surface 80 locked against lip 76 to prevent the opening of snap connector 50. The locking of lock surface 80 with lip 76 is shown in phantom in FIG. 8.

Slot 78 extends through catch 70, such that, when lock surface 80 of latch 72 is caught around lip 76, beveled surface 74 may be accessed by a screwdriver or other similar means and deflected or manipulated such that latch 72 can be removed from around lip 76. To release latch 72 in this manner, beveled surface 74 is simply contacted with a lever arm, such as a screwdriver, that is thin enough to be inserted into slot 78 in the direction indicated in FIG. 8, at arrow B, and is employed to bow latch 72 upward to release it from lip 76 of catch 70. In this manner, snap connector 50, may releasably engage pipes 10, 12, without the use of special tools or intricate design configurations. Moreover, the latch 72 and catch 70 are protected from inadvertent disengagement such that the integrity of the compressive seal effected by sealing 32 is maintained throughout use, until purposefully released.

In light of the foregoing, it should thus be evident that the present invention provides a snap connector for the coupling of pipes that substantially improves the art. While, in accordance with the patent statutes, only the best mode and preferred embodiments of the present invention have been described in detail hereinabove, the present invention is not to be limited thereto or thereby. Rather, the scope of the invention shall include all modifications and variations that fall within the scope of the attached claims.

The invention claimed is:

1. A pipe and snap connector assembly comprising:
 a first pipe having a receiving end defined by an expanded diameter terminating at an open end about which radially extends a first flange including inner and outer surfaces;
 a second pipe having a second flange radially extending from an insertion end of said second pipe, said second flange having inner and outer surfaces, said insertion end being sized to mate with said receiving end of said first pipe by fitting interiorly of the expanded diameter defining said receiving end, said insertion end being longer than said receiving end such that a gap exists between said first and second flanges when said insertion end of said second pipe is fully inserted into said receiving end of said first pipe;
 a seal disposed in said gap and contacting said inner surfaces of said first and second flanges, said seal having an uncompressed thickness greater than said gap; and
 a snap connector comprising:
  a radial clamp cavity of fixed dimensions defined by a radial wall joining side walls that engage said outer surfaces of said first and second flanges and axially urge said flanges together in compressive engagement with said seal; and
  a nesting cavity axially disposed outwardly of each side wall of said clamp cavity and receiving the expanded diameter of said receiving end of said first pipe at a selective axial position on either side of said radial clamp cavity.

2. The pipe and snap connector assembly of claim 1, wherein said snap connector further comprises:
 a male half providing a latch;
 a female half providing a catch; and
 a hinge pivotally connecting said male and female halves, said male and female halves being selectively joined by the mating of said latch and catch to complete said radial clamp cavity and said nesting cavity.

3. The pipe and snap connector assembly of claim 2, wherein said latch includes a beveled surface and said catch includes a lip, and the mating of said latch and catch involves bowing said latch over said lip by contacting said beveled surface with said lip.

4. The pipe and snap connector assembly of claim 3, wherein said latch and catch are selectively disjoined by manipulation of said beveled surface to remove said latch from said lip.

* * * * *